Melvin L. Weiner
INVENTOR.

ial three-
United States Patent Office 3,339,454
Patented Sept. 5, 1967

3,339,454
PROXIMAL REPRODUCTION PROCESS FOR THREE-DIMENSIONAL PERCEPTION
Melvin L. Weiner, 6 W. 74th St.,
New York, N.Y. 10023
Filed Oct. 19, 1965, Ser. No. 497,754
6 Claims. (Cl. 88—24)

ABSTRACT OF THE DISCLOSURE

A process for creating the illusion of three-dimensionality of an image projected on a two-dimensional screen by distorting the projected image in such a manner as to present to the retina of the eye of the viewer a stimulus the same as would have been presented by the actual three-dimensional object.

---

This invention relates to a method for optically reproducing three-dimensional scenes or objects.

Three-dimensional perception of an object or scene results from a particular distribution of stimuli on the retina of the eye. Three-dimensional perception may therefore be artificially reproduced by producing an image on a two-dimensional surface in such a manner as to present the retina of the eye with a stimulus distribution or proximal stimuli equivalent to that associated with perception of the real three-dimensional scene or object.

It is therefore a primary object of the present invention to photograph, record and project an image on a two-dimensional surface or projection screen in such a fashion as to provide the screen viewer with an equivalent proximal stimuli similar to that which is produced when the photographed object or scene is viewed, thereby producing an illusion of three-dimensionality.

This together with other objects and advantages which will become subsequently apparent reside in the details of construction and operation as are more fully hereinafter described and claimed, reference being had to the accompanying drawings forming a part hereof, wherein like numerals refer to like parts throughout, and in which:

Figure 1:
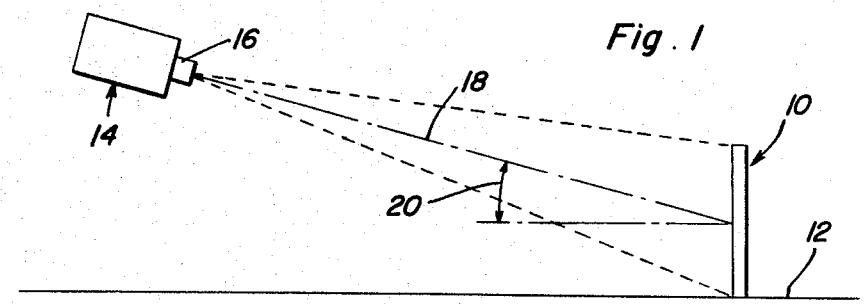
FIGURE 1 is a schematic side elevational view showing the method by which an object or scene may be photographed in accordance with the present invention.

Referring now to the drawings in detail, FIGURE 1 illustrates the manner in which a vertical object or scene 10 is photographed not only to record the object as it appears in a vertical plane but to also record it with respect to a horizontal plane or a plane extending in the direction of depth as indicated by the horizontal ground line 12. Toward this end, the camera 14 is so positioned that its objective 16 is aligned along an objective axis 18 which intersects the object 10 at a predetermined acute angle 20 to the horizontal 12. An angle such as 15° may be selected for this purpose as one example so that the image recorded by the camera 14 on film will be a perspective view which will include a portion of the depth dimension of the object.

Figure 2:
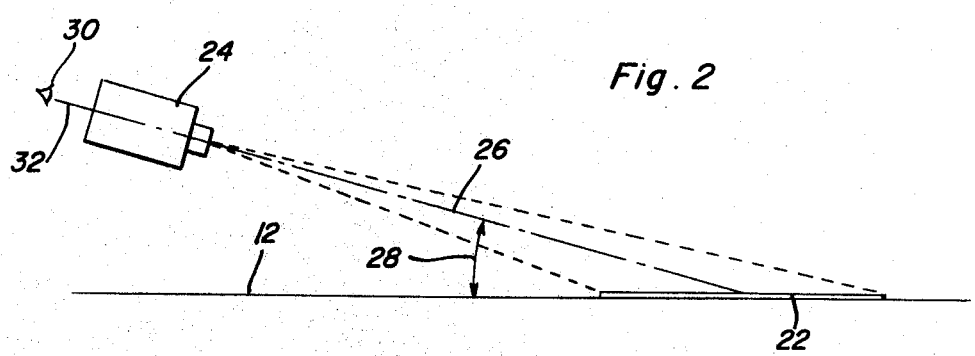
FIGURE 2 is a schematic side elevational view showing one method for projecting the photographed image onto a screen in accordance with the present invention.

The image recorded by the camera 14 on film may then be projected onto the viewing surface of a projection screen 22 as shown for example in FIGURE 2. In this embodiment of the invention the screen 22 is disposed substantially parallel to the horizontal or depth plane 12 while the projector 24 is aligned along a projection axis 26 which intersects the screen 22 at an angle 28 which is substantially equal to the angle 20 associated with the photographing arrangement shown in FIGURE 1. Therefore, the image projected onto the screen 22 from the projector 24, will not be a reproduction of the photograph of the object or scene 10 but will be, when viewed from a point perpendicular to the screen, an image which is distorted with respect to both the real object or scene and the photograph of the object or scene. However, when seen by a viewer, designated by reference numeral 30 in FIGURE 2, from a point along a viewing axis 32 which intersects the screen 22 at a vertical angle substantially equal to the angles 20 and 28 aforementioned it will produce a stimulus to the retina which will duplicate that which would have been produced had the actual three-dimensional object or scene been viewed from that angle. The viewer 30 should be located relatively close to the projector 24.

Figure 3:
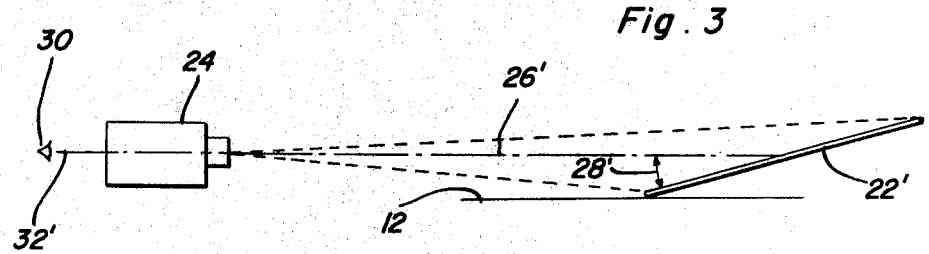
FIGURE 3 is a schematic side elevational view showing another method for projecting the image onto the screen in accordance with the present invention.

The arrangement described in FIGURE 2 involves the positioning of the projector 24 so that the projection axis is disposed at an angle to the horizontal ground line 12 in contrast to the usual arrangement wherein the projection axis is disposed generally parallel to the horizontal ground line. In order to accommodate the usual arrangement the illustration in FIGURE 3 shows the projector 24 and viewer 30 aligned along a projection axis 26' which is substantially parallel to the horizontal ground line 12. However, in order to preserve the angular relationship between the screen and projection axis, the screen 22' as shown in FIGURE 3 is inclined with respect to the horizontal 12 so that the projection axis 26' intersects the screen at an angle 28' equal to the angles 20 and 28 aforementioned in connection with FIGURES 1 and 2 respectively.

Figure 4:
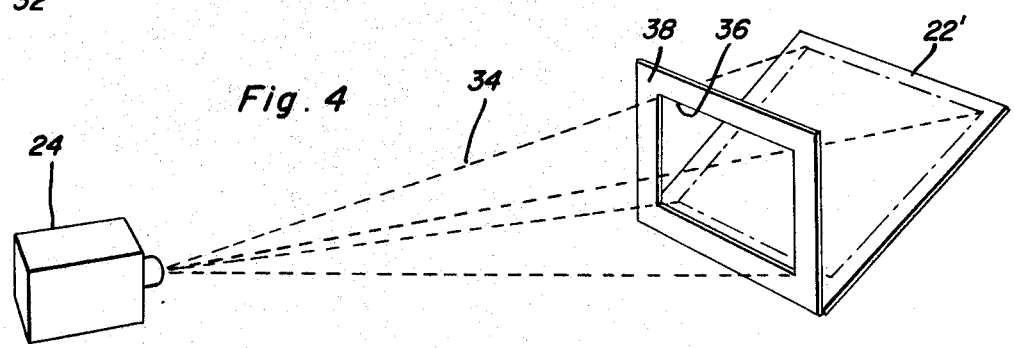
FIGURE 4 is a simplified perspective view similar to the projection method shown in FIGURE 3.

FIGURE 4 shows an arrangement similar to that illustrated in FIGURE 3 wherein the projector 24 is horizontally aligned and the screen 22' is inclined with respect to the horizontal. The projection beam 34 in such case may be admitted through the opening 36 in a vertically disposed mask 38 in order to project the image onto the viewing surface of the screen.

It will also be appreciated, that the concept associated with the optical reproduction method illustrated in FIGURES 1 through 4, could be applied to television wherein the picture tube of the television receiver constitutes the viewing screen. The positional and angular relationships aforementioned in connection with FIGURES 1 through 4 must, however, also be utilized in television picture reproduction in order to reproduce the equivalent stimulus distribution aforementioned which would mean building the television receiver with the picture tube inclined at an angle similar to that shown in FIGURE 3 to accommodate the normal horizontal viewing angle.

In the practicable application of the method of the present invention, if the viewing distance is less than 15 feet then the optimum three-dimensional illusion is obtained by viewing the projected image with only one eye. For viewing distances greater than 15 feet, substantially the same effects may be obtained by viewing the screen with both eyes. Further, to obtain maximum depth perception, the viewer should view the screen at angles in both the horizontal and vertical planes as close as possible to those between the projection axis and the screen, although as the viewing distance increases the larger will be the permissible deviations without significant impairment of the three-dimensional illusion. The application of the method of the present invention will therefore be most practical where viewers are sitting relatively close together so that they may view the screen from approximately the same angles as the projection angles. It will also be apparent that the method of the present invention while useful in connection with motion picture and television viewing, will also be particularly suitable for research, technical and demonstrational purposes where three-dimensional effects are important.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A method of producing an image on a two-dimensional viewing surface which gives the illusion to a viewer of viewing a three-dimensional object comprising the steps of: recording an image in perspective such that all three-dimensions of said object are visible when recorded on the recording surface; said recording surface being perpendicular to an objective axis intersecting said object at a predetermined acute angle to the plane of the depth dimension of the object; projecting said image recorded on the recording surface along a projection axis onto said viewing surface, said projection axis intersecting the viewing surface substantially at said predetermined acute angle; and viewing said two-dimensional viewing surface from a viewing location adjacent to or along the projection axis.

2. The method of claim 1 wherein said viewing surface is disposed parallel to the horizontal.

3. The method of claim 1 wherein said projection axis is disposed substantially parallel to the horizontal and said viewing surface is inclined thereto at said predetermined acute angle.

4. The method of claim 1 wherein there is positioned between the point of projection and the viewing surface an opaque mask body having a front surface facing the point of projection, a rear surface facing the viewing surface and an aperture therein through both front and rear surfaces; aiming said projection at the aperture in the mask so as to pass therethrough without obstruction; and viewing said viewing surface from the front-surface side of said mask.

5. A three-dimensional reproduction method comprising the steps of: photographing a vertical object along an objective axis inclined at an angle to the horizontal; recording the image in perspective such that all three dimensions of said object are visible when recorded on the film; projecting said image onto a horizontal screen along a projection axis intersecting the screen at said angle between the objective axis and the horizontal; and viewing the image projected on the screen from a point adjacent to or along a viewing axis intersecting the screen at a vertical angle substantially the same as the angle between the projection axis and the screen.

6. A three-dimensional reproduction method comprising the steps of: photographing a vertical object along an objective axis inclined at an angle to the horizontal; recording the image of said object in perspective such that all three dimensions are visible on the film; projecting said image along a horizontal axis onto a screen inclined at said angle to the horizontal; and viewing the image projected on the screen from a point adjacent to or along the projection axis.

References Cited
UNITED STATES PATENTS

| 2,335,700 | 11/1943 | Rogers | 88—24.24 |
| 2,448,568 | 9/1948 | Zwillinger et al. | 88—24.24 |
| 2,999,322 | 9/1961 | Hemstreet | 88—24.24 |

FOREIGN PATENTS

| 15,729 | 7/1906 | Great Britain. |

NORTON ANSHER, *Primary Examiner.*

W. M. FRYE, *Assistant Examiner.*